United States Patent [19]

Alexander

[11] Patent Number: 4,822,215
[45] Date of Patent: Apr. 18, 1989

[54] THRUST AND TORQUE SENSITIVE DRILL

[75] Inventor: Robert H. Alexander, Columbia, S.C.

[73] Assignee: Allen-Bradley Company, Inc., Milwaukee, Wis.

[21] Appl. No.: 199,066

[22] Filed: May 26, 1988

[51] Int. Cl.$^4$ ............................................. B23B 41/00
[52] U.S. Cl. ...................................... 408/9; 408/138; 318/433
[58] Field of Search ................... 408/8, 9, 10, 11, 137, 408/138, 141; 173/19, 29, 32, 154; 318/432, 433, 332

[56] References Cited

U.S. PATENT DOCUMENTS

| | | | |
|---|---|---|---|
| 3,572,447 | 3/1971 | Pauley et al. | 318/432 |
| 4,198,180 | 4/1980 | Schultz | 408/12 |
| 4,413,936 | 11/1983 | Kuhlmann | 173/11 |
| 4,478,538 | 10/1984 | Kakino | 408/9 |
| 4,487,270 | 12/1984 | Huber | 408/9 |
| 4,648,756 | 3/1987 | Alexander et al. | 408/12 |
| 4,688,970 | 8/1987 | Eckman | 408/9 |
| 4,745,557 | 5/1988 | Pekar et al. | 408/10 |

FOREIGN PATENT DOCUMENTS 45-26344  8/1970  Japan ........................ 408/9

Primary Examiner—Gil Weidenfeld
Assistant Examiner—Daniel W. Howell
Attorney, Agent, or Firm—Quarles & Brady

[57] ABSTRACT

A thrust and torque sensor is provided for an automatic drill so as to result in an efficient drilling operation for laminated materials. Sensors are placed in one instance in conjunction with a spindle and in another instance to a shaft in the drive train so as to sense the thrust and torque placed on the spindle. In a preferred manner, a yoke with strain gauges is connected to a bearing race on the spindle to sense thrust and strain gauges are placed on a beam connected to a shaft to sense torque. Signals from the strain gauges are then employed by a computer to control the drill.

15 Claims, 3 Drawing Sheets

THRUST AND TORQUE SENSITIVE DRILL

BACKGROUND OF THE INVENTION

This invention relates to drills and more particularly to drill controls for automatically changing the speed of a bit in response to the thrust and force exerted on the bit when drilling in a workpiece.

Reference is made to U.S. Pat. No. 4,648,756 which is commonly assigned. As indicated in that patent, in many instances a workpiece to be drilled is made up of a number of layers of different materials. These layers may consist of difficult to drill materials laminated with easier to drill materials. As an example, a typical workpiece might consist of one composed of greater than an inch of titanium that requires a drill speed of 360 RPM followed by an inch of aluminum which should be drilled at 4,000 RPM and then another ¼ inch of stainless of steel which also must be drilled at a lower speed. For maximum drill efficiency there is a need for a means to automatically control the drill rates through the various materials at the preferred drilling rates.

One means of controlling the drill rate is to sense the thrust of the drill as it drills through the various laminated layers. For example, in U.S. Pat. No. 4,478,538 there is disclosed a torque limiter 3 which includes a retainer 39 (see FIG. 3) and three balls 40 (see FIG. 2). When the drill is subjected to a high torque condition the balls 40 are pressed against the disc 33 with a great force and a loud sound is made. In U.S. Pat. No. 4,413,936 a longitudinal pin 28 acts as a transmitter to transmit forces from the tool receiving sleeve 16 to a controller 31 to thereby control rotational speed of the tool at different stages of drilling. In U.S. Pat. No. 4,487,270 a torque control is disclosed employing a conductive plastic disc 13 which functions as a pressure dependent resistor in conjunction with a pressure plate 12 and an electrode plate 14. In U.S. Pat. No. 4,198,180 a thrust controlled drilling apparatus is disclosed wherein a thrust sensor 23 with an air valve means acts in conjunction with a servo-valve unit 12 to affect a governor 11.

There is a need for a particular thrust and torque sensor which can be easily adapted for use in conjunction with a drill yet is in itself sensitive enough to be employed with a computer for controlling drill speed when drilling through laminated workpieces.

SUMMARY OF THE INVENTION

The invention provides a thrust and torque sensitive drill for rotationally driving a bit into a workpiece. A spindle is provided for mounting the bit. Drive gear means are operatively connected to the spindle to rotate the spindle and move the spindle in a linear manner. Thrust sensing means includes a bearing race means operatively connected to a first gear means of the drive gear means in a manner so as to move in a linear manner with respect thereto. A restraining lever is connected at one end to a drill housing and at another end to the bearing race means. Torque sensing means includes a shaft connected at one end to a drill housing and extending through a gear of the second gear means of the drive gear means. A bar member is connected at one end to the drill housing and extends toward the shaft in a cantilevered manner, the shaft being connected to the bar member in a pivotal manner. Sensing means are operatively associated with the restraining lever and the bar member to sense movement thereof and thereby detect the thrust and torque of the drill.

In a preferred aspect, the restraining lever is defined by a yoke member and the yoke member is connected to the bearing race by means of an annular groove.

In another preferred aspect, the bearing race means is mounted directly on a feed gear comprising a portion of the drive gear means and the bearing race is constructed and arranged to slide over the spindle.

In another preferred aspect, the sensing means includes strain gauge means connected to the restraining lever and the bar member.

In still other preferred aspects, the drive gear means includes a second gear means and the shaft extends through the second drive gear means; and the drive gear means includes a feed gear and a drive gear and the feed gear is driven by a clutch gear and the drive gear is driven by a spur gear.

It is therefore a principal object of the invention to provide a thrust and torque sensitive drill.

It is another object of the invention to provide a drill which can be easily and inexpensively fitted with the drill torque and thrust sensing means of this invention.

It is another object of the invention to provide a drill of the foregoing type which is especially adapted to be used in conjunction with a computerized controller.

It is yet another object of the invention to provide a drill of the foregoing type wherein thrust and torque measuring means are easily adapted to the sensing means for controlling the speed of the drill.

These and other objects and advantages of the invention will be apparent from the following detailed description and drawings.

DETAILED DESCRIPTION OF THE PREFERRED EMBODIMENTS

Figure 1:
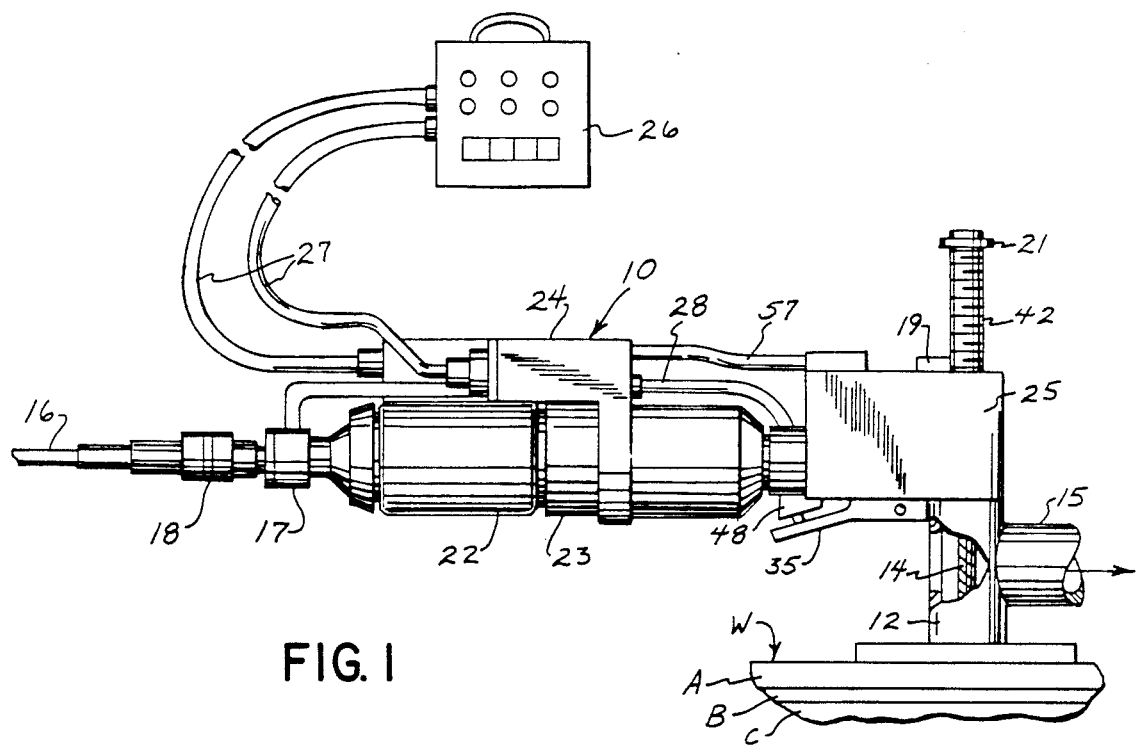
FIG. 1 is a side elevational view with portions broken away illustrating the drill of the present invention in position to drill a workpiece.

Referring to FIG. 1, a multispeed drill employing the thrust and torque sensing means of the invention is shown. The drill generally 10 has a mounting nose 12 which is shown attached to a workpiece W made up of layers A, B and C. The drill 10 rotationally drives and translationally feeds a bit 14 to drill a hole in the workpiece W. A vacuum duct 15 can be connected to the nose 12 to remove chips from the area of the workpiece W. In this regard, the drill is basically the same as that disclosed in the previously referred to U.S. Pat. No. 4,648,756 and its teachings are incorporated herein by reference. As indicated in the foregoing patent, the drill 10 is pneumatic, being powered by compressed air. The compressed air is supplied to the drill 10 by a flexible hose 16 which is connected to air inlet chamber 17 of the drill by a quick connect 18.

Figure 2:
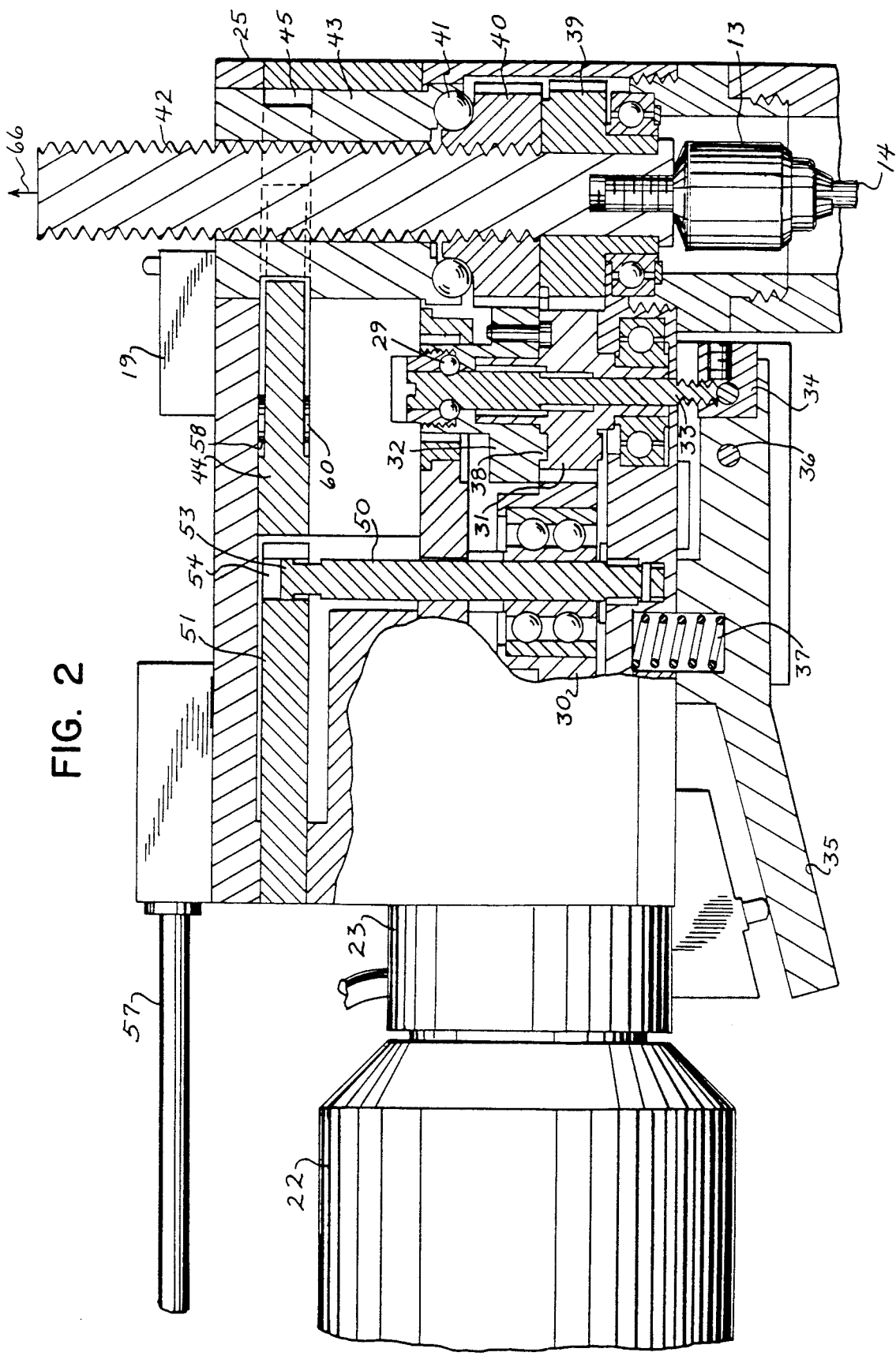
FIG. 2 is a partial view and in side elevation showing the drill of FIG. 1 and with portions broken away to show the torque sensing and thrust sensing means of this invention.

Just forward of the air inlet chamber 17 is a conventional governed air motor 22 such as one of the sliding vane type. The air motor 22 is the prime mover which converts the compressed air into rotary power so as to drive the bit 14. The drive is effected via the transmission 23 and the gear box 25. In this connection, the transmission 23 is the same as that disclosed in 31 of the previously referred to U.S. Pat. No. 4,648,756. The transmission output shaft is shown in the previously referred to patent at 50 and has a drive gear 84 for driving a bevel gear 86 and a spur gear 87. It is the spur gear 87 which would engage the spur gear 30 as shown in FIG. 2. The spur gear 30 engages another spur gear 31. A clutch gear 32 is slidable along the axis of the gear 31 by means of a shaft 33 acting through a ball bearing 29. The shaft 33 is connected by a pivoting block 34 to a lever 35 which is pivotal about the pin 36 and biased by a compression spring 37.

In a feed position (shown), lugs 38 of the clutch gear 32 engage corresponding lugs on the spur gear 31 so that the clutch gear 32 is driven by the spur gear 31. In an upwardly shifted retract position (not shown), the lugs 38 are shifted out of engagement with the spur gear 31 so that the clutch gear is in a neutral position. However, it will continue to be retained and engaged by the feed gear 40. The spur gear 31 drives the rotary drive gear 39 whereas the clutch gear 32 drives the feed gear 40. The rotary drive gear 39 is mounted to the spindle 42 to rotationally drive the spindle 42 but to enable the spindle 42 to slide up and down within the drive gear 39. The feed gear 40 is internally threaded to mesh with threads on the spindle 42 and can rotate relative to the drive gear 39. The gear ratio between the clutch gear 32 and the feed gear 40 is different from the gear ration between the spur gear 31 and the drive gear 39. Accordingly, in a feed position of the clutch gear 32, which is shown, the feed gear 40 rotates at a slightly higher speed relative to the spindle 42 so that the spindle 42 is advanced downwardly. This causes the bit 14 to engage the workpiece W as it is held by the chuck 13 connected to the spindle 42. In the retract position, the clutch gear 32 is stopped so that the feed gear 40 is stopped and the turning of the spindle 42 relative to the feed gear 40 retracts the spindle 42 upwardly in a very quick manner. Therefore, when the shaft 33 is shifted upwardly, the spindle 42 is retracting and when the shaft 33 is shifted downwardly, the spindle 42 is feeding. In this respect the drive gear 39 and the feed gear 40 relationship with respect to the spindle 42 is the same as described in the '756 patent.

Figure 3:
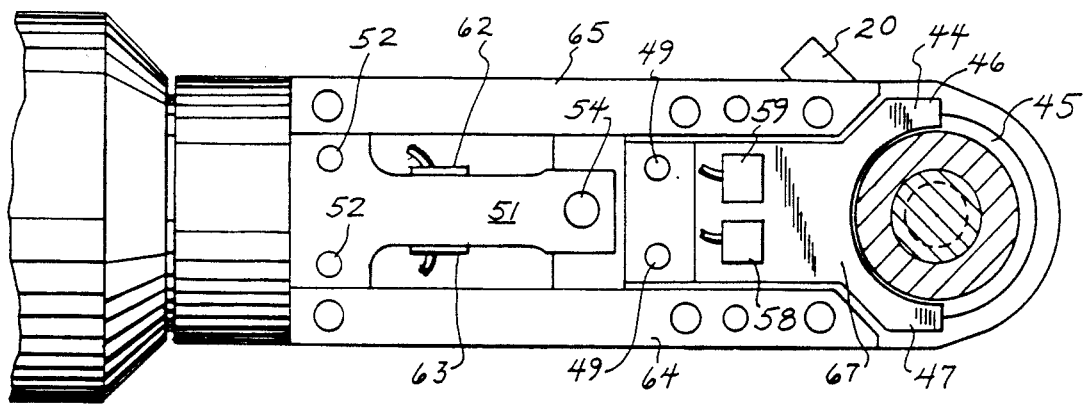
FIG. 3 is a top plan view of the torque and thrust sensing means shown in FIG. 2.

The thrust sensor of the present invention is disposed in the gear box 25 and includes a thrust bearing 41 retained over the feed gear 40 by the bearing race 43. A restraining lever or yoke 44 engages the bearing race 43 by the means of the groove 45 in the bearing race 43. As best seen in FIG. 3, the yoke 44 includes a yoke leg 67 connected to the housing of the drill by the screws 49. It extends between arms 64 and 65 of the housing. The yoke includes also the yoke arms 46 and 47 which are placed in groove 45 of the bearing race 43. Connected to the yoke 44 are four strain gauges three of which are shown at 58, 59 and 60. These are secured to the upper and lower surfaces of the yoke 44.

Figure 4:
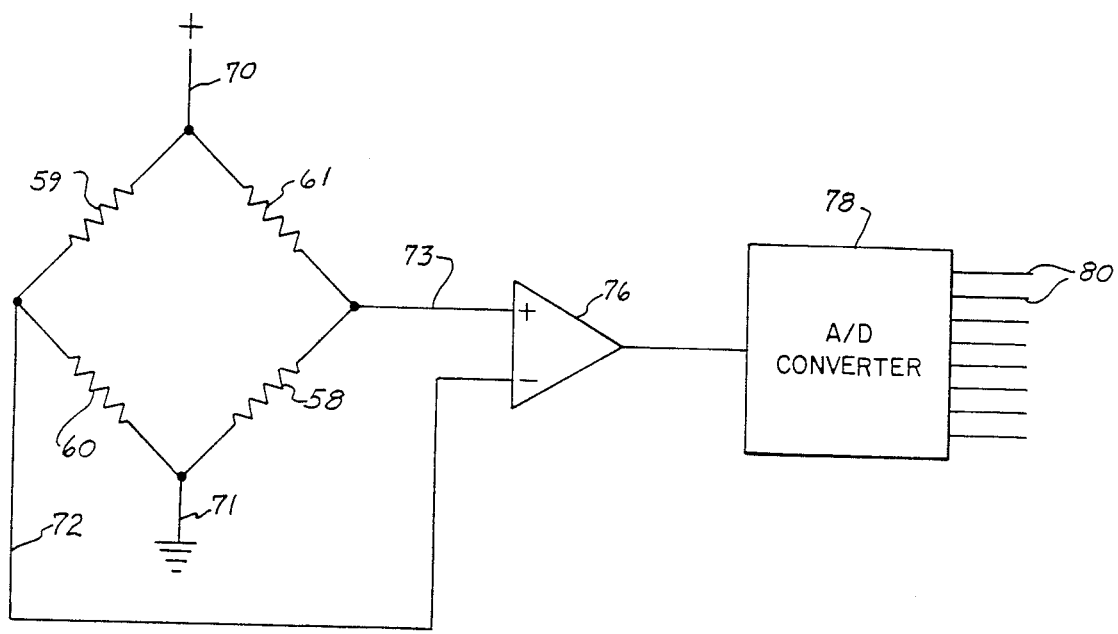
FIG. 4 is an electrical schematic representation illustrating the electrical portions of the thrust sensing means.

It should be pointed out that the strain gauges 58-60 act in conjunction with the yoke 44 in a compression mode and a tension mode. This is best seen with respect to the thrust sensor when viewed in FIG. 2. As the spindle is driven downwardly by means of the feed gear 40 and the drive gear 39 the thrust exerted on the spindle 42 will be in a direction upwardly as viewed in FIG. 2. This is seen by the directional arrow 66. The thrust exerted in this manner will in turn be translated to an upward motion on the yoke 44. This effects a compression mode for the strain gauge 58 as well as strain gauge 59 and a tension mode for the strain gauge 60 as well as a strain gauge 61 which is placed on the same side of the yoke 44 as the gauge 60. This compression and tension is then sensed by the gauges 58-61 which are interconnected in a bridge circuit by the lines 70, 71, 72 and 73 in the manner shown in FIG. 4. Lines 70 and 71 are connected to a d.c. voltage supply and output lines 72 and 73 are connected to the inputs of a differential amplifier 76. The output voltage of the differential amplifier 76 is proportional to the compression and tension sensed by the strain gauges 58-61. This output voltage is digitized by an analog to digital converter 78. The eight bit digital representation of the output voltage level, and hence the thrust, is fed over output lines 80 to the drill controller 26 shown in FIG. 1. In response to the sensed thrust, the controller 26 activates solenoid valves in the manifold 24. An electrical signal through the cable 27 changes the speed of the drill by activating a solenoid valve which sends air to the shift piston such as shown at 72 in U.S. Pat. No. 4,648,756 and in transmission 23. This is shown in FIG. 1. However, the standard circuitry for accomplishing it is not shown. Another valve retracts the bit 14 when it is at the completion of the drilling and the thrust drops to zero or when it becomes dull. As also shown in FIG. 1, a piston 48 is activated by air pressure in line 28 from one of the solenoids in manifold 25 to force the manual operator lever 35 to shift the second drive shaft 33 into the retract, upward, position. This retract solenoid is operated by either a signal from drill controller 26 or from the spindle switch 19 when contacted by the collar 21 when the spindle 42 reaches the bottom of its travel. It should also be noted in conjunction with FIG. 3 that a conventional pickup sensor 20 is mounted through the housing of the gearbox 25 to detect the rotation of the drive gear 39. The pickup sensor 20 produces an electrical output pulse as each tooth of the drive gear passes by its position. The output of the sensor 20 provides an indication of the rotational movement of the spindle 42 and bit 14 via cables 27 and 57 to the drill controller 26. The foregoing control features are more fully described in a copending application which is commonly assigned.

Figure 5:
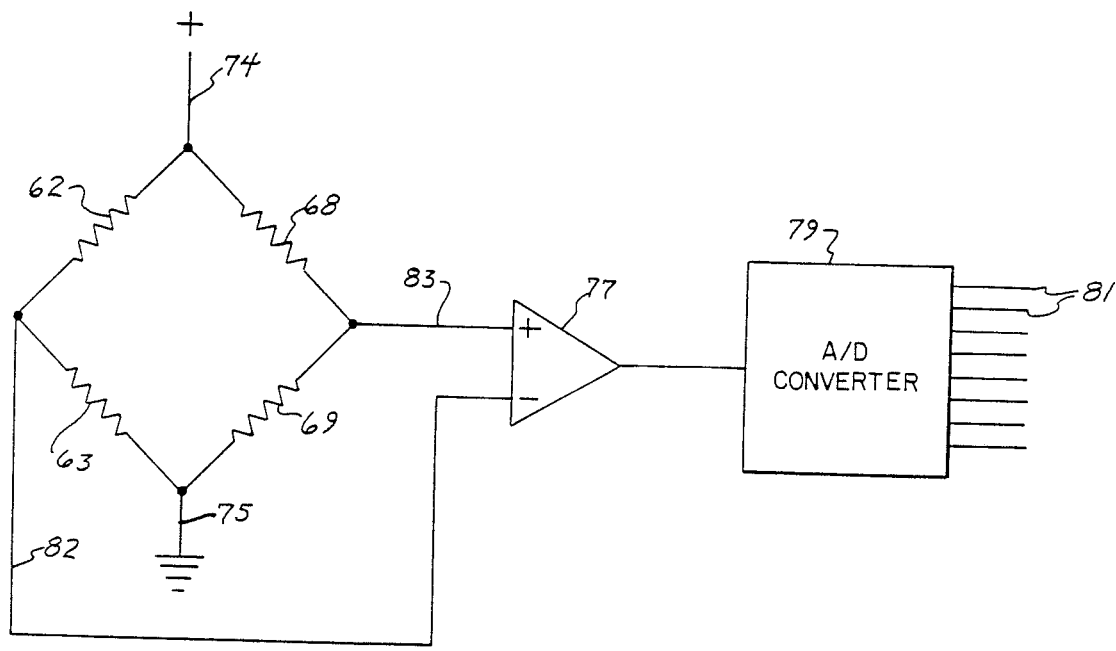
FIG. 5 is a view similar to FIG. 4 illustrating the electrical portions of the torque sensing means.

Referring to FIGS. 2 and 3, the torque sensor is also shown. It is disposed in the gear box 25 and includes the shaft 50 extending through the spur gear 30. A bar member or beam 51 is connected to the shaft 50 by the head 53 on the shaft 50 which is positioned in the compartment 54. The beam 51 is secured to the drill housing by the screws 52. The torque which is applied through the spur gear 30 and through the spur gear 31 and the clutch gear 32 and ultimately through the feed gear 40 and the drive gear 39 will produce a movement on the shaft 50 which tends to rotate the shaft 50 into the plane of the drawing as shown in FIG. 2. As best seen in FIG. 3, this will then effect a compression side on the strain gauge indicated at 62 and a tension side on strain gauge 63. In a manner previously described for the thrust sensor in conjunction with FIG. 4, and as illustrated in FIG. 5, gauge 62 and 63 are interconnected by lines 74 and 75 as well as lines 83 and 82 into a bridge circuit. Lines 74 and 75 are coupled to a d.c. power supply and lines 82 and 83 are connected to a differential amplifier 77. In this instance two fixed load resistors 68 and 69 are interconnected to the gauges 62 and 63. Amplifier 77 is in turn connected to A/D converter 79 which provides an eight bit digital representation of the torque to the controller 26 over lines 81 to the drill controller 26 as shown in FIG. 1. They will control the solenoid valves in the manifold 24 in the manner previously described in conjunction with the thrust sensor.

Accordingly, the signals from the strain gauges 58-63 are utilized by a computer to control the speed of the air motor 22 and consequently the speed of rotation of the rotary drive gear 39 and the feed gear 40 in conjunction with the thrust and torque exerted on the drill. In this manner the drill 10 can be efficiently operated.

It will thus be seen that the thrust and torque sensors of this invention find a particular advantage in conjunction with the drilling of laminated layers of materials having different degrees of hardness. The sensors can immediately determine that the drill bit 14 is engaging harder or softer material by an increase or decrease of the amount of thrust and torque exerted on the spindle 42 or the shaft 50. These signals are then utilized to increase or decrease the speed of the drill.

It should be pointed out that the invention is not limited to being used with a drill which is driven by an air motor. Instead it could be utilized with any type of prime mover which can be controlled by signals generated from sensors placed on the yoke 44 or the beam 51. Neither is it necessary that these sensing bars be in a particular geometric form as represented. For example, a yoke type bar could be substituted for the beam 51 and in the instance of the yoke 44 a closed annular arm attachment could be made in the groove 45. Strain gauges 58-62 are preferably of the foil type. However, they could be of the wire or semiconductor type.

It is also obvious that modifications and variations to the preferred embodiment in addition to those mentioned above will be apparent to those skilled in the art which will still result in drills within the scope of the preferred embodiments. For example, and although not resulting in an efficient operation the torque sensing feature could be used without the thrust sensing aspect or vice versa. Therefore, the invention is not intended to be limited by the description or drawings of the preferred embodiments, but only by the claims which follow.

I claim:

1. A thrust sensitive drill for rotationally driving a bit into a workpiece comprising:
   a spindle for mounting the bit;
   drive gear means operatively connected to said spindle to rotate said spindle and move said spindle in a linear manner;
   bearing race means operatively connected to said drive gear means and in a manner so as to move in linear manner with respect thereto;
   a restraining lever connected at one end to a drill housing and at another end to said bearing race means; and
   sensing means operatively associated with said restraining lever to sense movement of said lever and thereby detect the thrust of the drill.

2. A torque sensitive drill for rotationally driving a bit into a workpiece comprising:
   a spindle for mounting the bit;
   first gear means operatively connected to said spindle to rotate said spindle and move said spindle in a linear manner;
   second gear means operatively connected to said first gear means;
   a shaft connected at one end to a drill housing and extending through said second gear means;
   a bar member connected at one end to said drill housing and extending toward said shaft in a cantilevered manner, said shaft being connected to said bar member in rotatable manner; and
   sensing means operatively associated with said bar member to sense movement thereof and thereby detect the torque of the drill.

3. A thrust and torque sensitive drill for rotationally driving a bit into a workpiece comprising:
   a spindle for mounting the bit;
   drive gear means operatively connected to said spindle to rotate said spindle and move said spindle in a linear manner;
   bearing race means operatively connected to said drive gear means in a manner so as to move in a linear manner with respect thereto;
   a restraining lever connected at one end to a drill housing and at another end to said bearing race means;
   a shaft connected at one end to a drill housing and extending through a gear of said drive gear means;
   a bar member connected at one end to said drill housing and extending toward said shaft in a cantilevered manner, said shaft being connected to said bar member in rotatable manner; and
   sensing means operatively associated with said restraining lever and said bar member to sense movement thereof and thereby detect the thrust and torque of the drill.

4. The drill of claim 3 wherein said sensing means is connected to a computer to control the operation of the drill in response to said thrust and torque.

5. The drill of claim 1 wherein said restraining lever is defined by a yoke member and said yoke member is connected to said bearing race by means of an annular groove.

6. The drill of claim 5 wherein said bearing race means is mounted directly on a feed gear comprising a portion of said drive gear means.

7. The drill of claim 6 wherein said bearing race is constructed and arranged to slide over said spindle.

8. The drill of claim 1 wherein said sensing means includes strain gauge means connected to said restraining lever.

9. The drill of claim 3 wherein said drive gear means includes a second gear means and said shaft extends through said second drive gear means.

10. The drill of claim 1 wherein said drive gear means includes a feed gear and a drive gear.

11. The drill of claim 10 wherein said feed gear is driven by a clutch gear and said drive gear is driven by a spur gear.

12. The drill of claim 3 wherein said restraining lever is defined by a yoke member and said yoke member is connected to said bearing race by means of an annular groove.

13. The drill of claim 12 wherein said bearing race means is mounted directly on a feed gear comprising a portion of said drive gear means.

14. The drill of claim 13 wherein said bearing race is constructed and arranged to slide over said spindle.

15. The drill of claim 3 wherein said sensing means includes strain gauge means connected to said restraining lever and said bar member.

* * * * *